United States Patent
Kim et al.

(10) Patent No.: US 10,448,323 B2
(45) Date of Patent: Oct. 15, 2019

(54) NODE UNIT OF DISTRIBUTED ANTENNA SYSTEM

(71) Applicant: SOLiD, INC., Seongnam-si, Gyeonggi-do (KR)

(72) Inventors: Hyoungho Kim, Seoul (KR); Kwon Kim, Seoul (KR); Jonggu Lee, Guri-si (KR); Heegon Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/084,875

(22) Filed: Mar. 30, 2016

(65) Prior Publication Data

US 2016/0212699 A1    Jul. 21, 2016

Related U.S. Application Data

(63) Continuation of application No. PCT/KR2015/014451, filed on Dec. 29, 2015.

(30) Foreign Application Priority Data

Dec. 29, 2014 (KR) .......... 10-2014-0192227
Dec. 29, 2014 (KR) .......... 10-2014-0192228
Dec. 29, 2014 (KR) .......... 10-2014-0192232
Dec. 29, 2014 (KR) .......... 10-2014-0192234

(51) Int. Cl.
*H04W 52/02* (2009.01)
*H04B 1/40* (2015.01)

(52) U.S. Cl.
CPC .......... *H04W 52/0206* (2013.01); *H04B 1/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,994,965 A * | 11/1999 | Davis | ......... | H03F 1/52 330/279 |
| 6,429,706 B1 * | 8/2002 | Amin | ......... | G06F 1/26 327/143 |
| 2008/0005595 A1 * | 1/2008 | Spengler | ......... | G11B 33/126 713/300 |
| 2014/0308043 A1 * | 10/2014 | Heidler | ......... | H04B 10/11 398/115 |
| 2014/0308044 A1 | 10/2014 | Heidler et al. | | |

FOREIGN PATENT DOCUMENTS

KR    1993-0006230 B1    7/1993
KR    10-2008-0096202    10/2008

OTHER PUBLICATIONS

International Search Report issued in PCT/KR2015/014451 dated Dec. 29, 2015.
Written Opinion issued in PCT/KR2015/014451 dated May 11, 2016.

* cited by examiner

*Primary Examiner* — Zhitong Chen
(74) *Attorney, Agent, or Firm* — Sughrue Mion, PLLC

(57) ABSTRACT

A node unit of a distributed antenna system includes a power supply unit for supplying power for operating the node unit, a digital part operated by the power supplied from the power supply unit, the digital part performing digital processing on input relay signals and outputting the digital-processed relay signals, and a controller for disabling an output of the digital part in response to a first control command for instructing a reset of the power supply unit or a second control command for instructing a reset of the digital part.

13 Claims, 9 Drawing Sheets

NODE UNIT OF DISTRIBUTED ANTENNA SYSTEM

CROSS REFERENCE TO RELATED APPLICATIONS

This application is a Continuation of PCT International Application No. PCT/KR2015/014451, filed Dec. 29, 2015, and claims priority from Korean Patent Applications No. 10-2014-0192227, No. 10-2014-0192228, No. 10-2014-0192232 and No. 10-2014-0192234, filed Dec. 29, 2014, the contents of which are incorporated herein by reference in their entireties.

BACKGROUND

1. Field

The inventive concept relates to a distributed antenna system (DAS), and more particularly, to a node unit of a DAS, which enable the DAS to stably provide services.

2. Description of Related Art

In general, a distributed antenna system (DAS) is used to extend the service coverage of a base station in a mobile communication system or solve shadow areas. Recently, studies on a digital DAS for performing digital processing base station signals between node units constituting a DAS and user terminal signals and transmitting the digital-processed signals have been actively conducted due to various reasons such as a decrease in influence of noise, a decrease in transmission capacity, and convenience of signal processing.

In the digital DAS, spurious waves may be generated due to various causes. For example, when the supply of power to a node unit constituting the digital DAS is interrupted due to an unexpected accident, etc., spurious waves may be generated from digital elements (e.g., FPGA, CPU, ADC, DAC, and PLL) in the node unit. Alternatively, when power is supplied to a node unit to which the supply of power is interrupted, the digital elements in the node unit are initialized, and therefore, spurious waves may be generated from the digital elements in the node unit. Alternatively, when the power of a specific node unit or digital elements therein are to be reset as an obstacle occurs in the corresponding node during a normal service, spurious waves may be generated from the digital elements in the node unit.

When spurious waves are generated in a node unit of the DAS, the generated spurious waves may damage a specific signal processing component (e.g., a power amplification unit (PAU)) in the corresponding node unit, or may damage an adjacent node unit communicatively connected to the corresponding node unit as the spurious waves are transmitted to the adjacent node unit. Therefore, the service quality of the DAS is degraded.

Accordingly, there is required a method capable of preventing spurious waves from being generated in a node unit constituting the DAS.

SUMMARY

An embodiment of the inventive concept is directed to a node unit of a distributed antenna system capable of preventing spurious waves from being generated in various cases including when power is off, when power is supplied, when a power supply unit is reset, when a digital part is reset, and the like.

According to an aspect of the inventive concept, there is provided a node unit of a distributed antenna system, the node unit comprising: a power supply unit configured to supply power for operating the node unit; a digital part operated by the power supplied from the power supply unit, the digital part performing digital processing on input relay signals and outputting the digital-processed relay signals; and a controller configured to disable an output of the digital part in response to a first control command for instructing a reset of the power supply unit or a second control command for instructing a reset of the digital part.

According to an exemplary embodiment, wherein at least one of the first and second control command may be transmitted from a network management system communicatively connected to the node unit through a network or transmitted from local terminal.

According to an exemplary embodiment, wherein the digital part may include: a digital signal processor configured to perform a predetermined digital processing on the relay signals; and a digital termination output unit disposed at a termination in the digital part with respect to a transmission path of the relay signals, wherein the controller disables an output of at least one of the digital signal processor and the digital termination output unit.

According to an exemplary embodiment, wherein the controller may disable the output of the digital part in response to the first control command and then control a reset operation of the power supply unit and an initialization operation of the digital part according to the reset operation of the power supply unit, and, if the reset operation of the power supply unit and the initialization operation of the digital part are completed, enable the output of the digital part.

According to an exemplary embodiment, wherein the controller may determine whether the initialization operation of the digital part has been completed based on whether a phase lock loop (PLL) lock signal in the node unit is abnormal or whether the relay signal is abnormal.

According to an exemplary embodiment, wherein the controller may disable the output of the digital part in response to the second control command and then control an initialization operation of the digital part, and, if the initialization operation of the digital part is completed, enable the output of the digital part.

According to an exemplary embodiment, wherein the node unit may further include a node termination output unit disposed posterior to the digital part with respect to the transmission path of the relay signals, wherein the controller may disable an output of the node termination output unit in response to the first control command or the second control command.

According to an exemplary embodiment, wherein the controller may simultaneously disable the output of the digital part and the output of the node termination output unit or sequentially disable, at a predetermined time interval, the output of the digital part and the output of the node termination output unit, in response to the first control command or the second control command.

According to an exemplary embodiment, wherein the controller may disable the output of the digital part and the output of the node termination output unit in response to the first control command and then control a reset operation of the power supply unit and an initialization operation of the digital part according to the reset operation of the power supply unit, and, if the reset operation of the power supply and the initialization operation of the digital part are completed, enable the output of the digital unit and the output of the node termination output unit.

According to an exemplary embodiment, wherein the controller may simultaneously enable the output of the digital part and the output of the node termination output unit or sequentially enable, at a predetermined time interval, the output of the digital part and the output of the node termination output unit.

According to an exemplary embodiment, wherein the controller may disable the output of the digital part and the output of the node termination output unit in response to the second control command and control an initialization operation of the digital part, and, if the initialization operation of the digital part is completed, enable the output of the digital part and the output of the node termination output unit.

According to an exemplary embodiment, wherein the node termination output unit may be a power amplifier that amplifies the digital-processed relay signals.

According to an exemplary embodiment, wherein the node termination output unit may be an optical processing part that performs optical-to-electrical conversion or electrical-to-optical conversion on the digital-processed relay signals.

According to another aspect of the inventive concept, there is provided a node unit of a distributed antenna system, the node unit comprising: a power supply unit configured to supply power for operating the node unit; a digital part operated by the power supplied from the power supply unit, the digital part performing digital processing on input relay signals and outputting the digital-processed relay signals; a node termination output unit disposed posterior to the digital part with respect to a transmission path of the relay signals; and a controller configured to disable an output of the node termination output unit in response to a first control command for instructing a reset of the power supply unit or a second control command for instructing a reset of the digital part.

According to an exemplary embodiment, wherein the controller may disable an output of the digital part in response to the first control command or the second control command.

According to an exemplary embodiment, wherein the controller may simultaneously disable the output of the digital part and the output of the node termination output unit or sequentially disable, at a predetermined time interval, the output of the digital part and the output of the node termination output unit, in response to the first control command or the second control command.

In the node unit of the distributed antenna system according to the inventive concept, it is possible to prevent spurious waves from being generated in various cases including when power is off, when power is supplied, when a power supply unit is reset, when a digital part is reset, and the like. Thus, the distributed antenna system can stably provide high-quality services.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
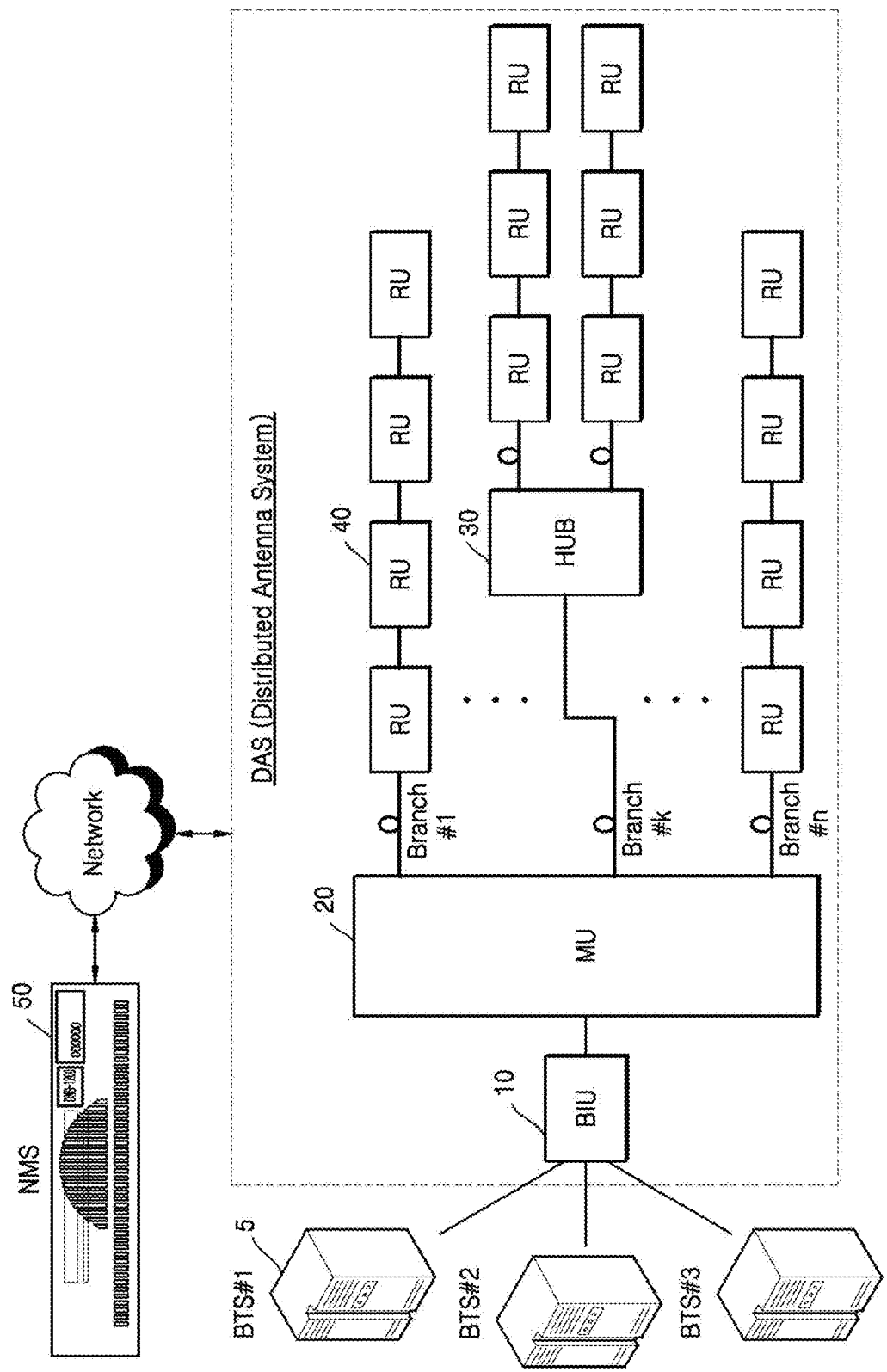
FIG. 1 is a diagram illustrating an example of a topology of a distributed antenna system (DAS) to which the inventive concept is applicable.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

FIG. 1 is a diagram illustrating an example of a topology of a distributed antenna system (DAS) to which the inventive concept is applicable.

Referring to FIG. 1, the DAS may include a base station interface unit (BIU) 10 and a main unit (MU) 20, which constitute a head-end node of the DAS, a hub unit (HUB) 30 serving as an extension node, and a plurality of remote units (RUs) 40 respectively disposed at remote service positions. The DAS may be implemented as an analog DAS or a digital DAS. When necessary, the DAS may be implemented as a hybrid of the analog DAS and the digital DAS (e.g., to perform analog processing on some nodes and digital processing on the other nodes).

However, FIG. 1 illustrates an example of the topology of the DAS, and the DAS may have various topologies in consideration of particularity of its installation areas and application fields (e.g., in-building, subway, hospital, stadium, etc.). In view of the above, the number of the BIU 10, the MU 20, the HUB 30, and the RUs 40 and connection relations between upper and lower nodes among the BIU 10, the MU 20, the HUB 30, and the RUs 40 may be different from those of FIG. 1. In the DAS, the HUB 30 may be used when the number of branches to be branched in a star structure from the MU 20 is limited as compared with the number of RUs 40 required to be installed. Therefore, the HUB 30 may be omitted when only the single MU 20 sufficiently covers the number of RUs 40 required to be installed, when a plurality of MUs 20 are installed, or the like.

Hereinafter, nodes in the DAS applicable to the inventive concept and their functions will be sequentially described based on the topology of FIG. 1.

The BIU 10 serves as an interface between a base station transceiver system (BTS) 5 and the MU 20. Although a case where three BTSs BTS#1 to BTS#3 are connected to the single BIU 10 is illustrated in FIG. 1, the BIU 10 may be separately provided for each provider, each frequency band, or each sector.

In general, a base station signal transmitted from the BTS 5 is a radio frequency (RF) signal of high power. Hence, the BIU 10 converts the RF signal of high power into a signal with power suitable to be processed in the MU 20 and transmits the converted signal to the MU 20. According to an embodiment, the BIU 10, as shown in FIG. 1, may receive base station signals for each frequency band (or each provider or each sector), combine the received signals, and then transmit the combined signal to the MU 20.

When the BIU 10 converts RF signals of high power, transmitted from the BTS 5, into mobile communication signals of low power, combines the RF signals, and then transmits the combined RF signal to the MU 20, the MU 20 may distribute the combined and transmitted RF signal for each branch. In this case, when the DAS is implemented as the digital DAS, the BIU 10 may be separated into a unit for converting RF signals of high power, transmitted from the BTS 5, into RF signals of low power, and a unit for converting RF signals of low power into intermediate frequency (IF) signals, performing digital signal processing on the converted IF signals, and then combining the processed digital signals. Alternatively, when the BIU 10 performs only the function of converting the RF signals of high power, transmitted from the BTS 5, into the RF signals of low power, the MU 20 may combine the transmitted RF signals and distribute the combined RF signal for each branch.

As described above, the combined RF signal distributed from the MU 20 may be transmitted to the RUs 40 through the HUB 30 or directly transmitted to the RUs 40, for each branch (see Branch #1, . . . , Branch #k, . . . , Branch #N of FIG. 1). Each RU 40 may separate the transmitted combined RF signal for each frequency band and perform signal processing (analog signal processing in the analog DAS and digital signal processing in the digital DAS). Accordingly, each RU 40 can transmit RF signals to user terminals in its own service coverage through a service antenna. Specific components and functions of the RU 40 will be described in detail below with reference to FIG. 4.

In FIG. 1, it is illustrated that the BTS 5 and the BIU 10 are connected through an RF cable, the BIU 10 and the MU 20 are connected through an RF cable, and all nodes from the MU 20 to lower nodes thereof are connected through optical cables. However, a signal transport medium between nodes may be variously modified. As an example, the BIU 10 and the MU 20 may be connected through an RF cable, but may be connected through an optical cable or a digital interface. As another example, the MU 20 and HUB 30 may be connected through an optical cable, the MU 20 and the RU 40 directly connected thereto may be connected through an optical cable, and the cascade-connected RUs 40 may be connected through an RF cable, a twist cable, a UTP cable, etc. As still another example, the MU 20 and the RU 40 directly connected thereto may also be connected through an RF cable, a twist cable, a UTP cable, etc.

Hereinafter, this will be described based on FIG. 1. Therefore, in this embodiment, each of the MU 20, the HUB 30, and the RUs 40 may include an optical transceiver module for electrical-to-optical (E/O) conversion/optical-to-electrical (O/E) conversion. When node units are connected through a single optical cable, each of the MU 20, the HUB 30, and the RUs 40 may include a wavelength division multiplexing (WDM) element.

The DAS may be connected to an external monitoring device, e.g., a network management server or system (NMS) 50. Accordingly, a manager can remotely monitor states and problems of the nodes in the DAS through the NMS 50, and can remotely control operations of the nodes in the DAS through the NMS 50.

Figure 2:
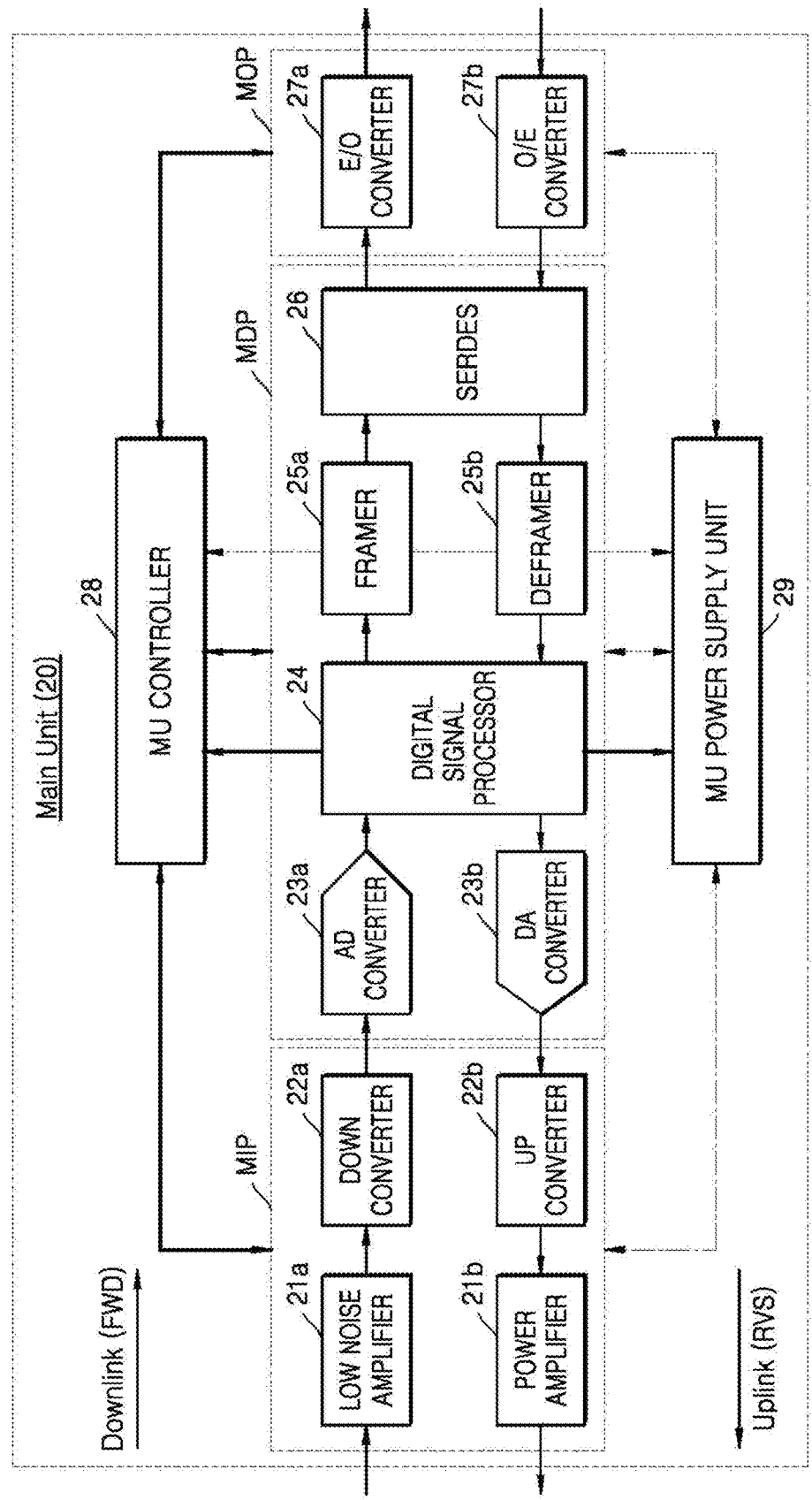
FIG. 2 is a block diagram illustrating an embodiment of a main unit in the DAS to which the inventive concept is applicable.

FIG. 2 is a block diagram illustrating an embodiment of the MU in the DAS to which the inventive concept is applicable. Here, the block diagram of FIG. 2 illustrates an embodiment in which, as described with reference to FIG. 1, the MU 20 is connected to the BIU 10 through an RF cable and connected to the HUB 30 or the RU 40 through an optical cable. Also, the block diagram of FIG. 2 exemplarily illustrates only components related to a function of performing, by the MU 20, a predetermined signal processing on signals transmitted from BIU 10 through a downlink path and then transmitting the signal-processed signals to the HUB 30 or the RU 40, and processing signals received from the HUB 30 or the RU 40 through an uplink path.

Referring to FIG. 2, based on a downlink path (i.e., a forward path (FWD)), the MU 20 may include a low noise amplifier 21a, a down converter 22a, an analog-to-digital (AD) converter 23a, a digital signal processor 24, a framer 25a, a serializer/deserializer (SERDES) 26, and an electrical-to-optical (E/O) converter 27a.

In the downlink path of the MU 20, RF signals transmitted from the BIU 10 (see FIG. 1) through an RF cable may be low-noise amplified by the low noise amplifier 21a and then frequency down-converted into an IF signal by the down converter 22a. The converted IF signals may be converted into digital signals by the AD converter 23a to be transmitted to the digital signal processor 24. The digital signal processor 24 may perform a function of digital signal processing, digital filtering, gain control, digital multiplexing, etc. on digitized RF signals for each frequency band. The digitized RF signals passing through the digital signal processor 24 may be formatted in a format suitable for digital transmission through the framer 25a, converted into serial digital signals by the SERDES 26, converted into optical digital signals by the E/O converter 27a, and then transmitted to a lower node unit, e.g., the HUB 30 (see FIG. 1) or the RU 40 (see FIG. 1) through an optical cable.

Based on an uplink path (i.e., a reverse path (RVS)), the MU 20 may include an optical-to-electrical (O/E) converter 27b, the SERDES 26, a deframer 25b, the digital signal processor 24, a digital-to-analog (DA) converter 23b, an up converter 22b, and a power amplifier 21b.

In the uplink path of the MU 20, optical digital signals transmitted from a lower node unit through an optical cable may be converted into electrical signals (serial digital signals) by the O/E converter 27b. The serial digital signals may be converted into parallel digital signals by the SERDES 26. The parallel digital signals may be reformatted by the deframer 25b to be processed for each frequency band in the digital signal processor 24. The digital signals passing through the digital signal processor 24 may be converted into analog signals through the DA converter 23b. Here, the analog signals are IF signals, and hence may be frequency up-converted into analog signals in the original RF band through the up converter 22b. The analog signals (i.e., the RF signals) converted into the analog signals in the original RF band is amplified through the power amplifier 21b and then transmitted to the BIU 10 through an RF cable.

In FIG. 2, the AD converter 23a, the DA converter 23b, the digital signal processor 24, the framer 25a, the deframer 25b, and the SERDES 26 may constitute a digital part MDP, and at least two of the AD converter 23a, the DA converter 23b, the digital signal processor 24, the framer 25a, the deframer 25b, and the SERDES 26 may be implemented as one field programmable gate array (FPGA). In addition, an MU controller 28 which will be described later may also be implemented, as the FPGA, together with the at least two of the AD converter 23a, the DA converter 23b, the digital signal processor 24, the framer 25a, the deframer 25b, and the SERDES 26. Although it is illustrated that the digital signal processor 24 and the SERDES 26 are commonly used in each of the downlink and uplink paths, the digital signal processor 24 and the SERDES 26 may be separately provided for each path.

In FIG. 2, the low noise amplifier 21a and the down converter 22a in the downlink path and the up converter 22b and the power amplifier 21b in the uplink path may constitute an interface part MIP. At least two of the low noise amplifier 21a and the down converter 22a in the downlink path and the up converter 22b and the power amplifier 21b in the uplink path may be implemented as one chip, e.g., a radio frequency integrated circuit (RFIC).

In FIG. 2, the E/O converter 27a and the O/E converter 27b may constitute an optical processing part MOP. Although it is illustrated that the corresponding E/O and O/E converters are provided in the downlink and uplink paths, respectively, the E/O and O/E converters may be implemented as a single optical transceiver module (e.g., a signal small form factor pluggable (SFP)).

In FIG. 2, it is illustrated that the power amplifier 21b and the up converter 22b are included in the MU 20. However, when the BIU 10, as described with reference with reference to FIG. 1, includes a unit for converting signals of high power into signals of low power or a unit for converting signals of low power into IF signals, processing the converted IF signals into digital signals, and then combining the processed digital signals, the power amplifier 21b and/or the up converter 22b may be omitted. Similarly, the low noise amplifier 21a and/or the down converter 22a may also be omitted in the MU 20, corresponding to components of the BIU 20.

Meanwhile, although not mentioned in the description related to the downlink and uplink paths, the MU 20 may further include an MU controller 28 and an MU power supply unit 29.

The MU controller 28 may control the components in the digital part MDP of the MU 20 to perform a required signal processing operation. For example, the MU controller 28 may control the digital signal processor 24, the framer 25a, the deframer 25b, the SERDES 26, and the like, corresponding to a kind of signal transmitted between upper nodes and/or lower nodes, a required quality, etc. Specifically, the MU controller 28 may determine a kind of signal such as CDMA, WCDMA, LTE, or WiBro signal, transmitted from BTS 5 or the RU 40, and may control the components in the digital part MDP, corresponding to the determined kind.

The MU controller 28 may enable or disable an output of each of the components in the digital part MDP. The MU controller 28 may generate a predetermined control signal to control an output operation of each of the components of the digital part MDP. The MU controller 28 may transmit the generated control signal to the corresponding component.

The MU controller 28 may control other components including the interface part MIP, the optical processing part MOP, the MU power supply unit 29, and the like in the MU 20, in addition to the digital part MDP. The MU controller 28 may enable or disable an output of the interface part MIP, the optical processing part MOP, etc.

The MU controller 28 may receive, from the NMS 50 (see FIG. 1) connected through a wired or wireless network, a control command for instructing a reset of the digital part MDP, a control command for instructing a reset of the MU power supply unit 29, or the like. Alternatively, the MU controller 28 may receive the control commands transmitted from an adjacent node unit, e.g., the HUB 30 or the RU 40.

The MU controller 28 may control an initialization operation of each of the components in the digital part MDP in response to the control command for instructing the reset of the digital part MDP. The MU controller 28 may control a reset operation of the MU power supply unit 29 in response to the control command for instructing the reset (e.g., a continuous power interruption/supply operation of the MU power supply unit 29 to re-operate the MU 20) of the MU power supply unit 29. The MU controller 28 may control an initialization operation of each of the components in the digital part MDP according to the reset operation.

The MU power supply unit 29 may supply power to the components in the MU 20, e.g., the interface part MIP, the digital part MDP, the optical processing part MOP, etc. so as to operate the MU 20. The MU power supply unit 29 may supply or interrupt power to the components in the MU 20 under control of the MU controller 28 or manager's direct control in an area in which the MU 20 is positioned.

Figure 3:
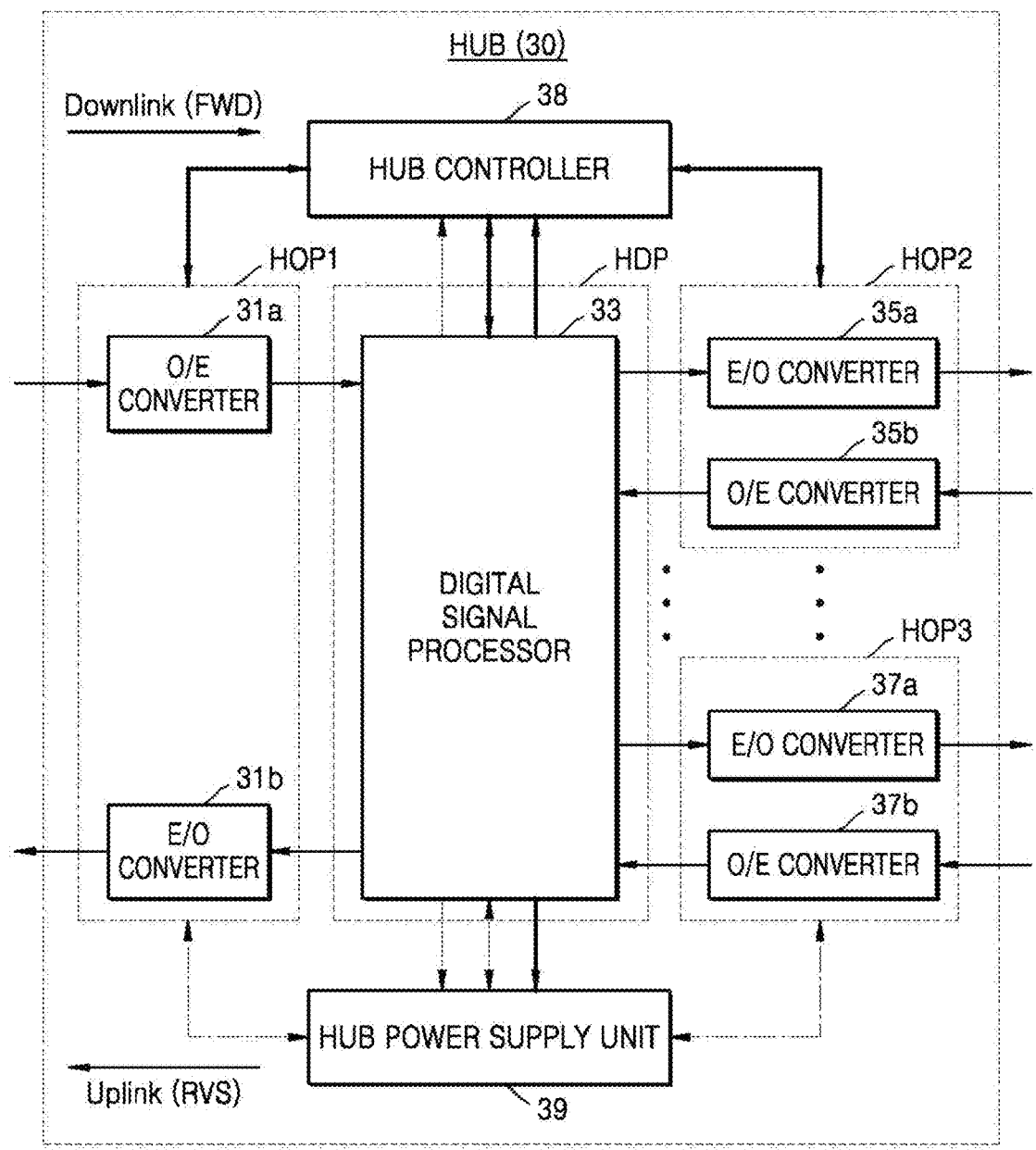
FIG. 3 is a block diagram illustrating an embodiment of a hub unit in the DAS to which the inventive concept is applicable.

FIG. 3 is a block diagram illustrating an embodiment of the HUB in the DAS to which the inventive concept is applicable.

Referring to FIG. 3, based on a downlink path, the HUB 30 may include an O/E converter 31a, a digital signal processor 33, and E/O converters 35a and 37a.

In the downlink path of the HUB 30, optical digital signals transmitted from the MU 20 through an optical cable may be converted into electrical signals by the O/E converter 31a. The digital signal processor 33 may perform a predetermined signal processing on the converted electrical signals and distribute the converted electrical signals to the plurality of E/O converters 35a and 37a. Each of the E/O converters 35a and 37a may receive the distributed signals to convert the electrical signals into optical digital signals and transmit the converted optical digital signals to a lower node unit, e.g., the RU 40 (see FIG. 1). Although only two E/O converters 35*a* and 37*a* are illustrated in FIG. 3 for convenience of illustration, the E/O converter may be provided in plurality corresponding to the number of lower node units connected to the HUB 30.

Based on an uplink path, the HUB 30 may include O/E converters 35*b* and 37*b*, the digital signal processor 33, and an E/O converter 31*b*.

Optical digital signals transmitted from the RU 40 through an optical cable may be converted into electrical signals by the O/E converters 35*b* and 37*b*. The digital signal processor 33 may combine the plurality of converted electrical signals and transmit the combined electrical signal to the E/O converter 31*b*. The E/O converter 31*b* may convert the combined electrical signal into an optical digital signal and transmit the converted optical digital signal to an upper node unit, e.g., the upper MU 20 (see FIG. 1).

In FIG. 3, the digital signal processor 33 of the HUB 30 may constitute a digital part HDP. The digital signal processor 33 may be implemented as an FPGA. In FIG. 3, it is illustrated that corresponding O/E and E/O converters are separately provided for each of optical processing parts HOP1, HOP2, and HOP3. However, as described with reference to FIG. 2, each of the optical processing parts HOP1, HOP2, and HOP3 may be configured as a single optical transceiver module.

Meanwhile, although not mentioned in the description related to the downlink and uplink paths, the HUB 30 may further include a HUB controller 38 and a HUB power supply unit 39.

The HUB controller 38 may control the digital part HDP to perform a required signal processing operation. The HUB controller 38 may enable or disable an output of the digital part HDP. The HUB controller 38 may generate a predetermined control signal to control an output operation of the digital part HDP. The HUB controller 38 may transmit the generated predetermined control signal to the digital part HDP.

The HUB controller 38 may control the optical processing parts HOP1, HOP2, and HOP3 and the HUB power supply unit 39 in the HUB 30, in addition to the digital part HDP. The HUB controller 38 may enable or disable an output of each of the optical processing parts HOP1, HOP2, and HOP3.

The HUB controller 38 may receive, from the NMS 50 (see FIG. 1) connected through the wired or wireless network, a control command for instructing a reset of the digital part HDP, a control command for instructing a reset of the HUB power supply unit 39, which will be described later, or the like. Alternatively, the HUB controller 38 may receive the control commands transmitted from an adjacent node unit, e.g., the MU 20 or the RU 40.

The HUB controller 38 may control an initialization operation of the digital part HDP in response to the control command for instructing the reset of the digital part HDP. The HUB controller 38 may control a reset operation of the HUB power supply unit 39 in response to the control command for instructing the reset (e.g., a continuous power interruption/supply operation of the HUB power supply unit 39 to re-operate the HUB 30) of the HUB power supply unit 39. The HUB controller 38 may control an initialization operation of the digital part HDP according to the reset operation.

The HUB power supply unit 39 may supply power to components in the HUB 30, e.g., the digital part HDP, the optical processing parts HOP1, HOP2, and HOP3, and the like. The HUB power supply unit 39 may supply or interrupt power to the components in the HUB 30 under control of the HUB controller 38 or manager's direct control in an area in which the HUB 30 is positioned.

Figure 4:
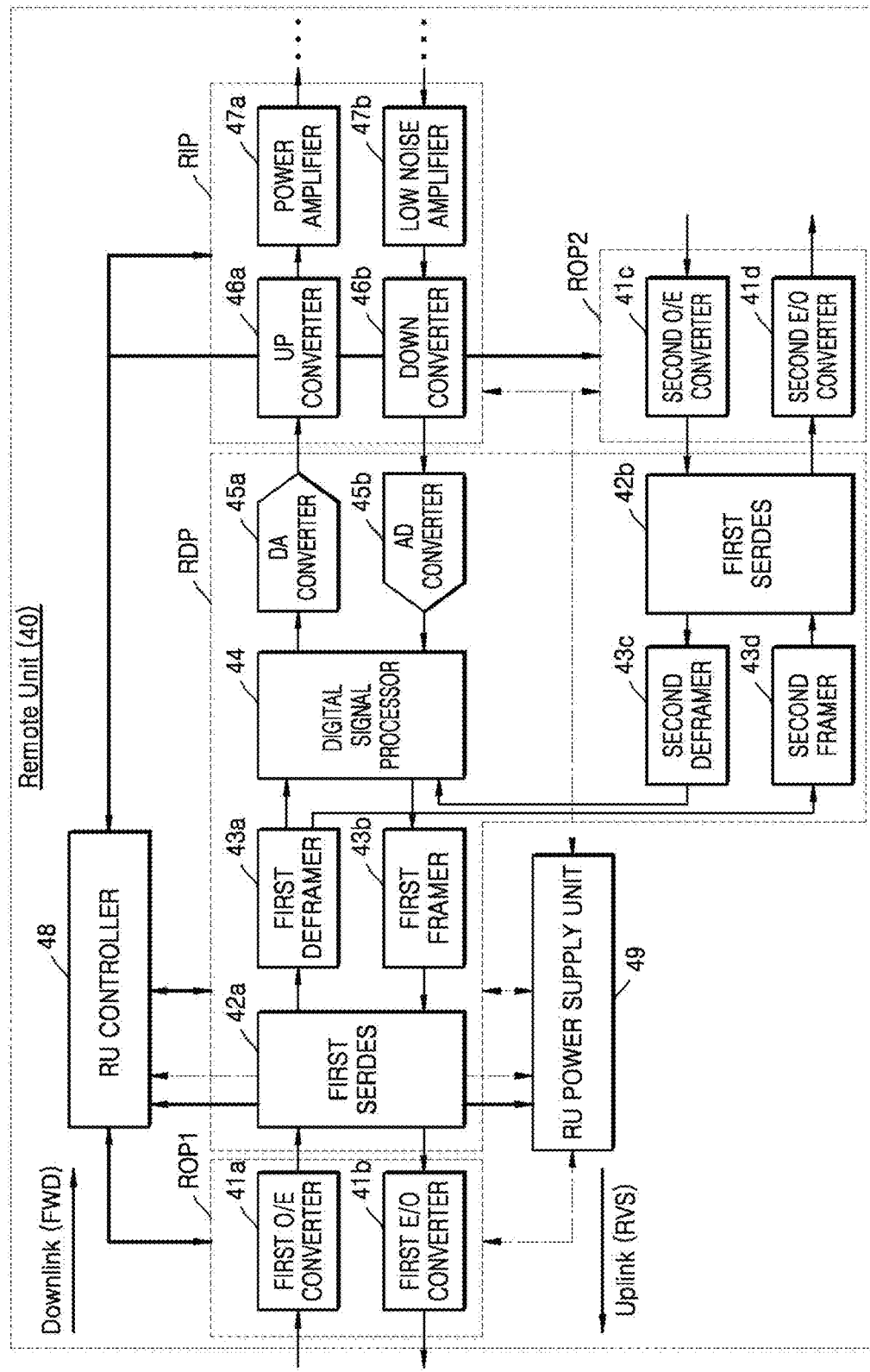
FIG. 4 is a block diagram illustrating an embodiment of a remote unit in the DAS to which the inventive concept is applicable.

FIG. 4 is a block diagram illustrating an embodiment of the RU in the DAS to which the inventive concept is applicable.

Here, the block diagram of FIG. 4 illustrates an embodiment related to the RU 40 in the digital DAS in which node units are connected through an optical cable. Also, the block diagram of FIG. 4 illustrates only components related to a function of providing terminal in a service coverage with signals from an upper node unit through a downlink path and processing terminal signals received from the terminals in the service coverage through an uplink path.

Referring to FIG. 4, based on a downlink path, the RU 40 may include a first O/E converter 41*a*, a first SERDES 42*a*, a first deframer 43*a*, a digital signal processor 44, a DA converter 45*a*, an up converter 46*a*, and a power amplifier 47*a*.

In the downlink path of RU 40, optical digital signals transmitted from an upper node unit (the MU 20 or the HUB 30) (see FIG. 1) through an optical cable may be converted into electrical signals (serial digital signals) by the first O/E converter 41*a*. The serial digital signals may be converted into parallel digital signals by the first SERDES 42*a*. The parallel digital signals may be reformatted by the first deframer 43*a* to be processed for each frequency band in the digital signal processor 44. The digital signal processor 44 may perform a function of digital signal processing, digital filtering, gain control, digital multiplexing, etc. on the reformatted digital signals for each frequency band. The digital signals passing through the digital signal processor 44 may be converted into analog signals through the DA converter 45*a*. Here, the analog signals are IF signals, and hence may be frequency up-converted into analog signals in the original RF band through the up converter 46*a*. The analog signals (i.e., the RF signals) converted into the analog signals in the original RF band may be amplified through the power amplifier 47*a* to be transmitted through a service antenna (not shown).

Meanwhile, in the downlink path, the RU 40 may output the signals reformatted by the first deframer 43*a* to a second deframer 43*c* to be transmitted to a lower node unit connected thereto through an optical cable. For example, the signals reformatted by the first deframer 43*a* may be output to the second deframer 43*c*, and the second deframer 43*c* may reformat the reformatted signals to be output to a second SERDES 42*b*. The second SERDES 42*b* may convert the input signals into serial digital signals to be output to a second E/O converter 41*d*, and the second E/O converter 41*d* may convert the input signals into optical digital signals to be transmitted to the lower node unit through the optical cable.

Based on an uplink path, the RU 40 may include a low noise amplifier 47*b*, a down converter 46*b*, an AD converter 45*b*, the digital signal processor 44, a first framer 43*b*, the first SERDES 42*a*, and a first E/O converter 41*b*.

In the uplink path of the RU 40, RF signals (i.e., terminal signals) received through the service antenna (not shown) from a user terminal (not shown) in a service coverage may be low-noise amplified by the low noise amplifier 47*b* and frequency down-converted into IF signals by the down converter 46*b*. The converted IF signals may be converted into digital signals by the AD converter 45*b* to be transmitted to the digital signal processor 44. The digital signals passing through the digital signal processor 44 may be formatted in a format suitable for digital transmission through the first framer 43b and converted into serial digital signals by the first SERDES 42a. The serial digital signals may be converted into optical digital signals by the first E/O converter 41b to be transmitted to an upper node unit through an optical cable.

Meanwhile, in the uplink path, optical digital signals received from the lower node unit through the optical cable may be converted into serial digital signals by the second O/E converter 41d. The serial digital signals may be converted into parallel digital signals by the second SERDES 42b. The parallel digital signals may be reformatted by a second deframer 43d to be output to the digital signal processor 44.

In this case, the digital signal processor 44 may combine the digital signals received and digital-processed through the service antenna and the digital signals received from the lower node unit and output the combined signals to the first framer 43b. The first framer 43b may format the combined signals in a format suitable for digital transmission and output the formatted signals. The combined signals output from the first framer 43b may be converted into serial digital signals by the first SERDES 42a, converted into optical digital signals by the first E/O converter 41b, and then transmitted to the upper node unit.

As described with reference to FIG. 4, the first and second SERDESs 42a and 42b, the first and second deframers 43a and 43c, the first and second framers 43b and 43d, the digital signal processor 44, the DA converter 45a, and the AD converter 45b in the RU 40 may constitute a digital part RDP, and at least two of the first and second SERDESs 42a and 42b, the first and second deframers 43a and 43c, the first and second framers 43b and 43d, the digital signal processor 44, the DA converter 45a, and the AD converter 45b may be implemented as one FPGA. In addition, an RU controller 48 which will be described later may also be implemented, as the FPGA, together with the at least two of the first and second SERDESs 42a and 42b, the first and second deframers 43a and 43c, the first and second framers 43b and 43d, the digital signal processor 44, the DA converter 45a, and the AD converter 45b. Although it is illustrated in FIG. 4 that the first and second SERDESs 42a and 42b and the digital signal processor 44 are commonly used in each of the downlink and uplink paths, the first and second SERDESs 42a and 42b and the digital signal processor 44 may be separately provided for each path.

In FIG. 4, the up converter 46a and the power amplifier 47a in the downlink path and the low noise amplifier 47b and the down converter 46b in the uplink path may constitute an interface part RIP. At least two of the up converter 46a and the power amplifier 47a in the downlink path and the low noise amplifier 47b and the down converter 46b in the uplink path may be implemented as one chip, e.g., one RFIC.

In FIG. 4, the first O/E converter 41a and the first E/O converter 41b, and the second O/E converter 41c and the second E/O converter 41d may constitute optical processing port ROP1 and ROP2, respectively. Although it is illustrated that the corresponding E/O and O/E converters are provided in the downlink and uplink paths, respectively, the E/O and O/E converters may be implemented as a single optical transceiver module.

Meanwhile, although not mentioned in the description related to the downlink and uplink paths, the RU 40 may further include an RU controller 48 and an RU power supply unit 49.

The RU controller 48 may control the components in the digital part RDP to perform a required signal processing operation. For example, the RU controller 48 may control the digital signal processor 44, the first and second deframers 43a and 43c, the first and second framers 43b and 43d, the first and second SERDESs 42a and 42b, and the like, corresponding to a kind of signal transmitted between upper nodes and/or lower nodes, a required quality, etc.

The RU controller 48 may enable or disable an output of each of the components in the digital part RDP. The RU controller 48 may generate a predetermined control signal to control an output operation of each of the components of the digital part RDP. The RU controller 48 may transmit the generated control signal to the corresponding component.

The RU controller 48 may control other components including the interface part RIP, the optical processing parts ROP1 and ROP2, the RU power supply unit 49, and the like in the RU 40, in addition to the digital part RDP. The RU controller 48 may enable or disable an output of the interface part RIP, the optical processing parts ROP1 and ROP2, etc.

The RU controller 48 may receive, from the NMS 50 (see FIG. 1) connected through the wired or wireless network, a control command for instructing a reset of the digital part RDP, a control command for instructing a reset of the RU power supply unit 49, or the like. Alternatively, the RU controller 48 may receive the control commands transmitted from an adjacent node unit, e.g., the MU 20 or the HUB 30.

The RU controller 48 may control an initialization operation of each of the components in the digital part RDP in response to the control command for instructing the reset of the digital part RDP. The RU controller 48 may control a reset operation of the RU power supply unit 49 in response to the control command for instructing the reset (e.g., a continuous power interruption/supply operation of the RU power supply unit 49 to re-operate the RU 40) of the RU power supply unit 49. The RU controller 48 may control an initialization operation of each of the components in the digital part RDP according to the reset operation.

The RU power supply unit 49 may supply power to components in the RU 40, e.g., the interface part RIP, the digital part RDP, the optical processing parts ROP1 and ROP2, and the like. The RU power supply unit 49 may supply or interrupt power to the components in the RU 40 under control of the RU controller 48 or manager's direct control in an area in which the RU 40 is positioned.

In the above, a configuration example of one form of the topology of the DAS, the MU 20, the HUB 30, and the RU 40 has been described with reference to FIGS. 1 to 4. However, the configuration example of FIGS. 1 to 4 is merely one embodiment, and it will be apparent that various application examples may be considered.

When the DAS is implemented as the digital DAS, each of the node units constituting the DAS, e.g., the MU, the HUB, and the RU, include a digital part (e.g., the digital part MDP of FIG. 2, the digital part HDP of FIG. 3, or the digital part RDP of FIG. 4) for performing digital processing on signals to be transmitted to a user terminal based on a downlink path or signals to be transmitted to a base station based on an uplink path (hereinafter, referred to as relay signals).

The digital part of each of the node units includes a digital signal processor for performing various digital signal processings, such as image rejection, blocking of DC components, digital filtering, signal processing for each frequency allocation (FA) or sector, and multiplexing, on the relay signals by using a previously programmed algorithm, an AD converter for performing digital conversion, a DA converter for performing analog conversion, and the like.

The digital part of each of the node units may output spurious waves generated from components constituting the digital part in various cases such as when power is suddenly interrupted, when power is again supplied in the stat in which the power is interrupted, and when power is reset or a reset operation for performing an initialization operation of the components constituting the digital part. The spurious waves may damage other components in the corresponding node unit, or may be transmitted to an adjacent node to damage components in the adjacent node. In addition, the spurious waves may degrade the service quality of the DAS. Accordingly, there is required a method for effectively interrupting the spurious waves.

The relay signals are output via a component (hereinafter, referred to as a digital termination output unit) disposed at a termination with respect to a signal transmission path in the digital part of each of the node units, e.g., the DA converter 45a disposed at a termination with respect to the downlink path in the digital part RDP of FIG. 4. Therefore, in order to prevent spurious waves generated from the digital part of each of the node units from being output from the digital part, it may be required to control the output of each of the components in the digital part.

Moreover, in order to prevent spurious waves generated from the digital part of each of the node units from being transmitted to an adjacent node, it may be required to control the output of a component (hereinafter, referred to as a node termination output unit) disposed at a termination with respect to a signal transmission path in the digital part of each of the node units, e.g., a component such as the E/O converter 27a disposed at a termination with respect to the downlink path in the MU 20 shown in FIG. 2 or the power amplifier 47a disposed at a termination with respect to the downlink path in the RU 40 shown in FIG. 4.

Hereinafter, methods for interrupting the output of spurious waves according to the inventive concept will be described with reference to FIGS. 5 to 10. Meanwhile, although it is illustrated below that embodiments for interrupting the output of spurious waves according to the inventive concept are applied to any one of the MU 20, the HUB 30, and the RU 40 of the DAS described with reference to FIGS. 1 to 4, the inventive concept is not limited thereto. It will be apparent that the methods according to the inventive concept may be applied to digital relays, mobile communication base station systems, and the like.

Figure 5:
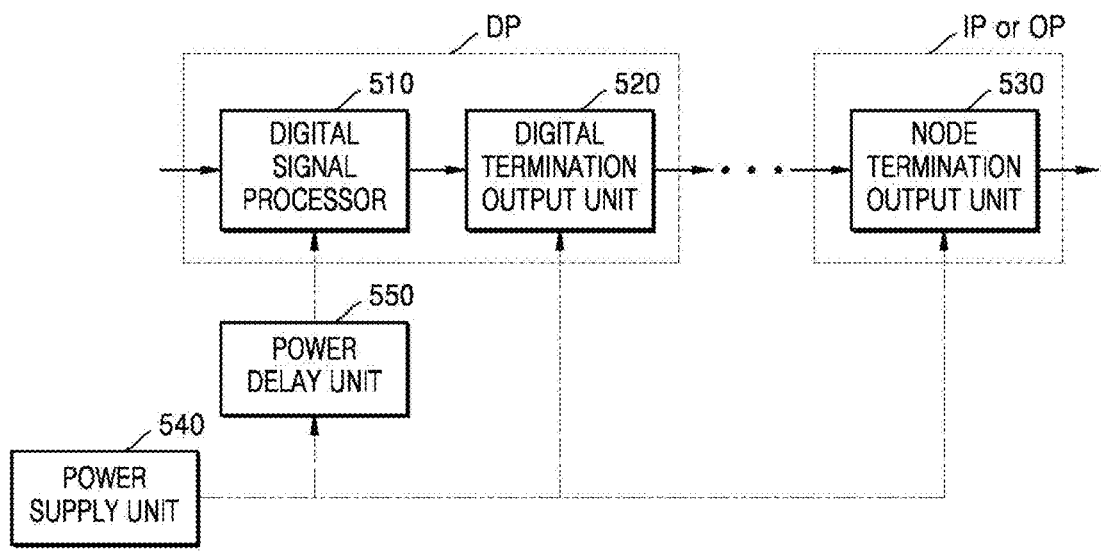
FIG. 5 is a block diagram illustrating some components for interrupting the output of spurious waves in a node unit according to an embodiment of the inventive concept.

FIG. 5 is a block diagram illustrating some components for interrupting the output of spurious waves in a node unit according to an embodiment of the inventive concept.

Referring to FIG. 5, the node unit may include a digital signal processor 510, a digital termination output unit 520, a node termination output unit 530, a power supply unit 540, and a power delay unit 550. Here, the digital signal processor 510 and the digital termination output unit 520 may be included in a digital part DP of the node unit, and the node termination output unit 530 may be included in an interface part IP or an optical processing part OP.

The digital signal processor 510 may perform a predetermined digital processing on input relay signals as described with reference to FIGS. 2 to 4.

The digital termination output unit 520 may be a component disposed at a termination with respect to a signal transmission path. The digital termination output unit 520 may perform a predetermined digital processing on the relay signals digital-processed by the digital signal processor 510.

In an embodiment, the digital termination output unit 510 may be an AD converter or DA converter.

The node termination output unit 530 may be a component for interfacing between the node unit and another adjacent node unit or interfacing between the node unit and a base-station-side unit/user terminal. For example, the node termination output unit 530 may be an O/E converter or E/O converter. In another embodiment, the node termination output unit 530 may be implemented as a power amplifier for amplifying relay signals, an up converter for frequency up-converting relay signals, a low noise amplifier for performing low-noise amplification so as to remove noises of relay signals, a down converter for frequency down-converting relay signals, or the like.

The power supply unit 540 may supply power for operation to each component in the node unit. Specifically, the power supply unit 540 may supply power for operation to the digital signal processor 510, the digital termination output unit 520, and the node termination output unit 530 in the node unit.

The power delay unit 550 delays the time required to supply power from the power supply unit 540 to the digital signal processor 510. When the supply of power through the power supply unit 540 is suddenly interrupted (e.g., interruption of power or interruption of the supply of power due to a connection failure between the power supply unit 540 and an AC power source), the power of the digital termination output unit 520 and/or the node termination output unit 530 may be off earlier than that of the digital signal processor 510.

Accordingly, when spurious waves are generated due to interruption of the supply of power to the digital signal processor 510, it is possible to prevent the generated spurious waves from being output from the digital part DP to damage a component (e.g., a power amplifier of the interface part IP) posterior to the digital part DP in the node unit. Further, it is possible to prevent the generated spurious waves from being transmitted to an adjacent node unit.

Figure 6:
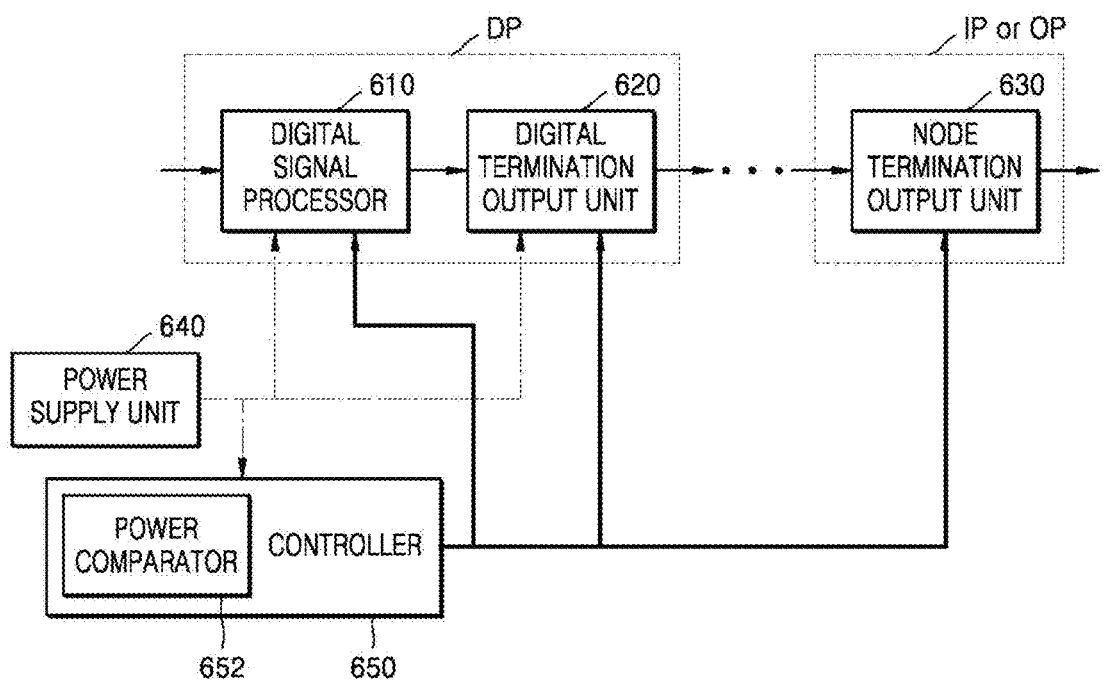
FIG. 6 is a block diagram illustrating some components for interrupting the output of spurious waves in a node unit according to another embodiment of the inventive concept.
Figure 7:
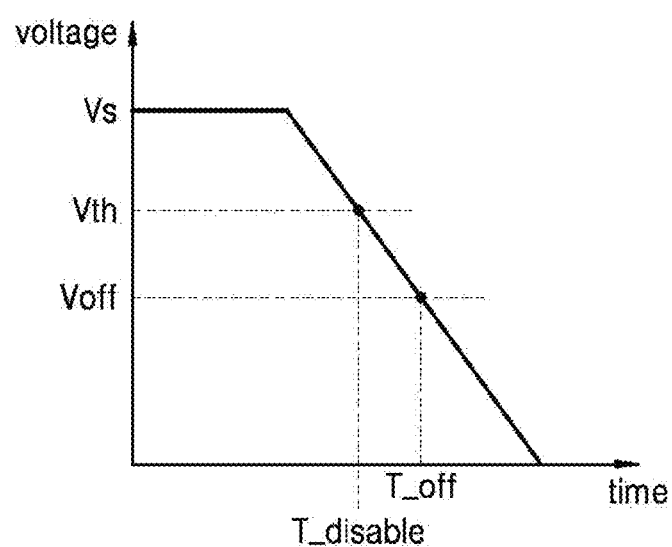
FIG. 7 is a graph illustrating a threshold voltage and a power interruption recognition voltage, which are comparison targets of a voltage comparator.

FIG. 6 is a block diagram illustrating some components for interrupting the output of spurious waves in a node unit according to another embodiment of the inventive concept. FIG. 7 is a graph illustrating a threshold voltage and a power interruption recognition voltage, which are comparison targets of a voltage comparator. In FIG. 6, for convenience of illustration, descriptions overlapping with those of FIG. 5 will be omitted, and differences will be mainly described.

First, referring to FIG. 6, the node unit may include a digital signal processor 610, a digital termination output unit 620, a node termination output unit 630, a power supply unit 640, and a controller 650. Meanwhile, although not shown in FIG. 6, the node unit may further include a power delay unit as shown in FIG. 5.

The controller 650 may control an output of each of the components in the node unit, e.g., the digital signal processor 610, the digital termination output unit 620, the node termination output unit 630 and the power supply unit 640. As an example, the controller 650 may disable or enable the output of each of the components in the node unit. As another example, the controller 650 may control the digital signal processor 610 to fix, as '0,' the output of the digital signal processor 610 among the components in the node unit or to output a predetermined value where spurious waves are not generated. Meanwhile, the controller 650 may correspond to that of each of the MU 20, the HUB 30, and the RU 40, described with reference to FIGS. 2 to 4.

The controller 650 may include a voltage comparator 652 for comparing magnitudes of a voltage supplied from the power supply unit 640 to the components in the node unit and a previously set threshold voltage Vth. Here, the threshold voltage Vth may be a voltage that becomes a reference for determining whether the voltage supplied from the power supply unit 640 to the components in the node unit is abnormal. The threshold voltage Vth may be previously set based on operation characteristics of the power supply unit 640 or power characteristics of the digital signal processor 610.

Further referring to FIG. 7, when assuming that the magnitude of a normal output voltage from the power supply unit 640 in a normal operation state is Vs and that the magnitude of a power interruption recognition voltage at which the digital signal processor 610 recognizes power supply interruption of the power supply unit 640 is Voff, the threshold voltage Vth may be set as a voltage smaller than the normal output voltage Vs and greater than the power interruption recognition voltage Voff.

The controller 650 may control whether to disable an output function of at least one of the digital signal processor 610, the digital termination output unit 620, and the node termination output unit 630, based on the voltage comparison result of the voltage comparator 652. Alternatively, the controller 650 may control an output value of the digital signal processor 610, based on the voltage comparison result of the voltage comparator 652.

Specifically, if the magnitude of the voltage supplied from the power supply unit 640 to the components in the node unit is smaller than that of the threshold voltage Vth, the controller 650 may disable the output of at least one of the digital signal processor 610, the digital termination output unit 620, and the node termination output unit 630. Alternatively, if the magnitude of the voltage supplied from the power supply unit 640 to the components in the node unit is smaller than that of the threshold voltage Vth, the controller 650 may control the digital signal processor 610 to output a predetermined value where spurious waves are not generated.

Accordingly, before a point of time (see T_off of FIG. 7) when the digital signal processor 610 recognizes the fact of power supply interruption, the controller 650 can disable the output of each of the components in the node unit or control the digital signal processor 610 to output a value where spurious waves are not generated.

As a result, the output of the digital signal processor 610 is disabled before the power supply of the power supply unit 640 is completely interrupted, so that the generation of spurious waves can be prevented. Alternatively, the output of at least one of the digital termination output unit 620 and the node termination output unit 630 is first interrupted, so that when spurious waves are generated in the digital signal processor 610, it is possible to prevent the generated spurious waves from being output to the digital part or being transmitted to an adjacent node unit. In addition, the controller 650 controls the digital signal processor 610 to output a value where spurious waves are not generated before the output of the digital terminal output unit 620 and/or the node termination output unit 630 is disabled, so that it is possible to prevent the spurious waves from being output from the digital part or being transmitted to an adjacent node.

Meanwhile, in the above, it is illustrated that the voltage comparator 652 is included in the controller 650, but the inventive concept is not limited thereto. According to an embodiment, the voltage comparator 652 may be implemented separately from the controller 650. In this case, the voltage comparator 652 may compare power supplied from the power supply unit 640 and the threshold voltage Vth and control the output of each of the digital signal processor 610, the digital termination output unit 620, and the node terminal output unit 630, based on the comparison result, thereby interrupting spurious waves.

Figure 8:
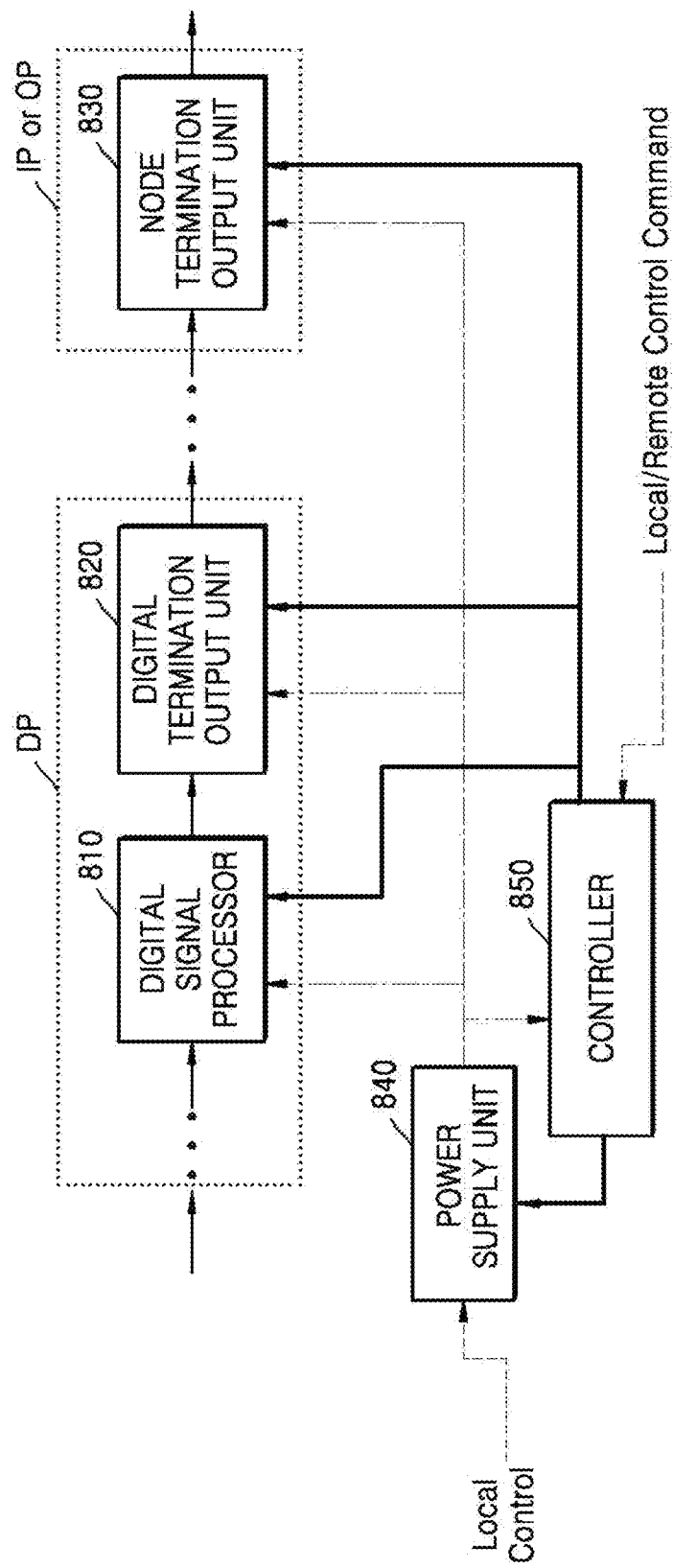
FIG. 8 is a block diagram illustrating some components for interrupting the output of spurious waves in a node unit according to still another embodiment of the inventive concept.

FIG. 8 is a block diagram illustrating some components for interrupting the output of spurious waves in a node unit according to still another embodiment of the inventive concept. FIG. 8 is a diagram illustrating an embodiment capable of interrupting the generation of spurious waves when it is required to perform an initialization operation in a digital part of the node unit, such as a power supply operation of the node unit (e.g., an operation of supplying power to the node unit during initial setting), a reset operation of a power supply unit (e.g., an operation of interrupting power to re-operate the node unit and then continuously supply the power), or a reset operation of the digital part (e.g., an operation of resetting settings of components constituting the digital part). In FIG. 8, for convenience of illustration, descriptions overlapping with those of FIGS. 5 and 6 will be omitted, and differences will be mainly described.

Referring to FIG. 8, the node unit may include a digital signal processor 810, a digital termination output unit 820, a node termination output unit 830, a power supply unit 840, and a controller 850.

The digital signal processor 810 and the digital termination output unit 820 may constitute a digital part DP, and may perform an initialization operation when power is on, when the power supply unit 840 is reset, or when the digital part DP is reset. The initialization operation of the digital signal processor 810 and the digital termination output unit 820 may be controlled by the controller 850.

The power supply unit 840 may supply power to the digital signal processor 810, the digital termination output unit 820, the node termination output unit 830, and a controller 850. The power supply unit 840 may determine whether to supply power under control of the controller 850. Alternatively, the power supply unit 840 may determine whether to supply power under manager's direct control (e.g., local control such as when the manager manipulates a power switch connected to the power supply unit 840 or when the manager manipulates a reset switch) at a position at which the node unit is installed.

The controller 850 may receive a remote control command for instructing a reset of the digital part DP from the NMS (see reference numeral 50 of FIG. 1) communicatively connected to the node unit through a network, and control the reset of the digital part DP in response to the remote control command. Alternatively, the controller 850 may receive a local control command for instructing the reset of the digital part DP from a manager's local terminal communicatively connected to the node unit through short-range wireless communication, etc., and control the reset of the digital part DP in response to the local control command. However, the inventive concept is not limited thereto. The controller 850 may directly sense whether an obstacle occurs in the node unit, etc., and reset the digital part DP, based on the sensing result. Meanwhile, the controller 850 may receive, from an adjacent node unit, the remote control command, the local control command, etc.

In order to prevent spurious waves from being generated due to initialization of the digital signal processor 810 and the digital termination output unit 820 of the digital part PD when the digital part DP is reset, the controller 850 may disable at least one of the output of the digital signal processor 810 and the output of the digital termination output unit 820. In an embodiment, the controller 850 does not disable the output of the digital part DP but may disable the output of the node termination output unit 830. In another embodiment, the controller 850 may disable the output of at least one of the components of the digital part DP and the output of the node termination output unit 830. In this case, the controller 850 may simultaneously disable the output of at least one of the components of the digital part DP and the output of the node termination output unit 830. Alternatively, the controller 850 may sequentially disable, at a predetermined time interval, the output of at least one of the components of the digital part DP and the output of the node termination output unit 830. For example, the controller 850 may first disable the output of the node termination output unit 830 and then disable the output of at least one of the components of the digital part DP.

Subsequently, the controller 850 may control the initialization operation of the digital signal processor 810 and the digital termination output unit 820. If the initialization operation of the digital part DP is completed, the controller 850 may enable the disabled components. According to an embodiment, when the controller 850 disables the output of at least one of the components of the digital part DP and the output of the node termination output unit 830, if the initialization operation of the digital part DP is completed, the controller 850 may simultaneously enable the output of the disabled component among the components of the digital part DP and the output of the node termination output unit 830. Alternatively, the controller may sequentially enable, at a predetermined time interval, the output of the disabled component among the components of the digital part DP and the output of the node termination output unit 830. Meanwhile, the controller 850 may determine whether the initialization operation of the digital part has been completed based on whether a phase lock loop (PLL) lock signal in the node unit is abnormal or whether a relay signal digital-processed in the node unit is abnormal.

The controller 850 may receive a remote control command for instructing a power supply start or power supply reset of the power supply unit 840 through the NMS (or the local terminal), and control the power supply start or power supply reset of the power supply unit 840 in response to the remote control command. However, the inventive concept is not limited thereto. The controller 850 may directly sense whether an obstacle occurs in the node unit, etc., and control the reset of the power supply unit 840, based on the sensing result. Meanwhile, when the manager controls the power supply start or power supply reset of the power supply unit 840 at a position at which the node unit is installed, the controller 850 may monitor a power supply state of the power supply unit 840 and control whether the output of the digital part DP and/or the node termination output unit 830, which will be described later, and the initialization operation of the display part DP, based on the monitoring result.

In order to prevent spurious waves from being generated from the digital signal processor 810 and the digital termination output unit 820 of the digital part DP as the digital part DP is initialized according to the power supply start or power supply reset of the power supply unit 840, the controller 850 may disable at least one of the output of the digital signal processor 810 and the output of the digital termination output unit 820. Like the reset control of the digital part DP, the controller 850 does not disable the output of the digital part DP but may disable the output of the node termination output unit 830. The controller 850 may simultaneously disable the output of at least one of the components of the digital part DP and the output of the node termination output unit 830, or may sequentially disable, at a predetermined time interval, the output of at least one of the components of the digital part DP and the output of the node termination output unit 830.

Subsequently, the controller 850 may control the power supply start or power supply reset of the power supply unit 840. Like the reset control of the digital part, the controller 850 may continuously control the initialization operation of the digital signal processor 810 and the digital termination output unit 820. If the initialization operation of the digital part DP is completed, the controller 850 may enable the disabled components.

According to the control of the reset of the power supply unit 840, the reset of the digital part DP, and the like, which are performed by the controller 850, it is possible to prevent spurious waves from being output from the digital part not only when the manager remotely controls the reset of the power supply unit 840, the reset of the digital part DP, etc. due to the installation position of the node unit of the DAS and local limitation but also when the manager directly controls, on the spot, the reset of the power supply unit 840, the reset of the digital part DP, etc. Further, although spurious waves are generated, it is possible to prevent the spurious waves from being transmitted to an adjacent node. Accordingly, it is possible to prevent degradation of the service quality of the DAS and to ensure service reliability.

Meanwhile, in the above, it has been mainly described that the controller 850 directly controls the output of each of the components in the node unit during the reset of the power supply unit 840 or the reset of the digital part DP. However, the inventive concept is not limited thereto. For example, the node unit may further include a predetermined output control circuit capable of disabling/enabling the output of each of the components of the node unit in hardware manner. In this case, the controller 850 may control the predetermined output control circuit to disable/enable the output of each of the components of the node unit.

Figure 9:
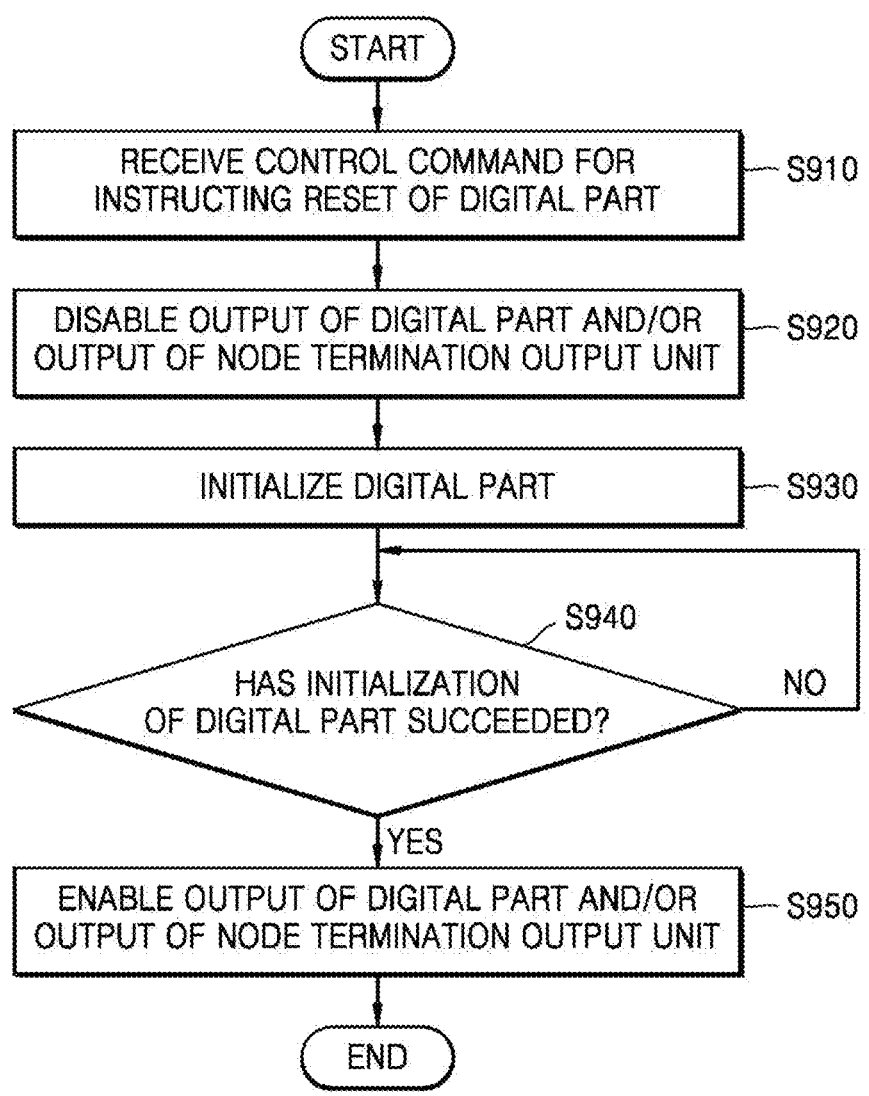
FIG. 9 is a flowchart illustrating a spurious wave interruption method according to an embodiment of the inventive concept.

FIG. 9 is a flowchart illustrating a spurious wave interruption method according to an embodiment of the inventive concept. Steps shown in FIG. 9 are configured as steps processed in time series in the controller 850 of the node unit shown in FIG. 8. Thus, the above-described contents related to the node unit shown in FIG. 8, although some of them are omitted, can be applied to the spurious wave interruption method of FIG. 9.

In step S910, the controller 850 receives a control command for instructing a reset of the digital part DP. The controller 850 may remotely receive the control command through the NMS or the local terminal.

In step S920, the controller 850 disables an output of the digital part DP and/or an output of the node termination output unit 830. Here, the controller 850 may disable an output of at least one of the digital signal processor 810 and the digital termination output unit 820.

In step S930, the controller 850 controls an initialization operation of the components in the digital part DP.

In step S940, the controller 850 determines whether the initialization operation of the components in the digital part DP has been successfully completed. According to an embodiment, the controller 850 may determine whether the initialization operation of the digital part DP has succeeded based on whether the PLL lock signal in the node unit is abnormal or whether the relay signal digital-processed in the node unit is abnormal. However, the inventive concept is not limited thereto. The controller 850 may determine whether the initialization operation of the components in the digital part DP has succeeded based on whether a predetermined time elapses.

If it is determined in step S940 that the initialization operation of the digital part DP has succeeded, the controller 850, in step S950, may enable the output of the disabled components. If it is determined in step S940 that the initialization operation of the digital part DP has not succeeded, the controller 850 may again perform steps S930 and S940.

Figure 10:
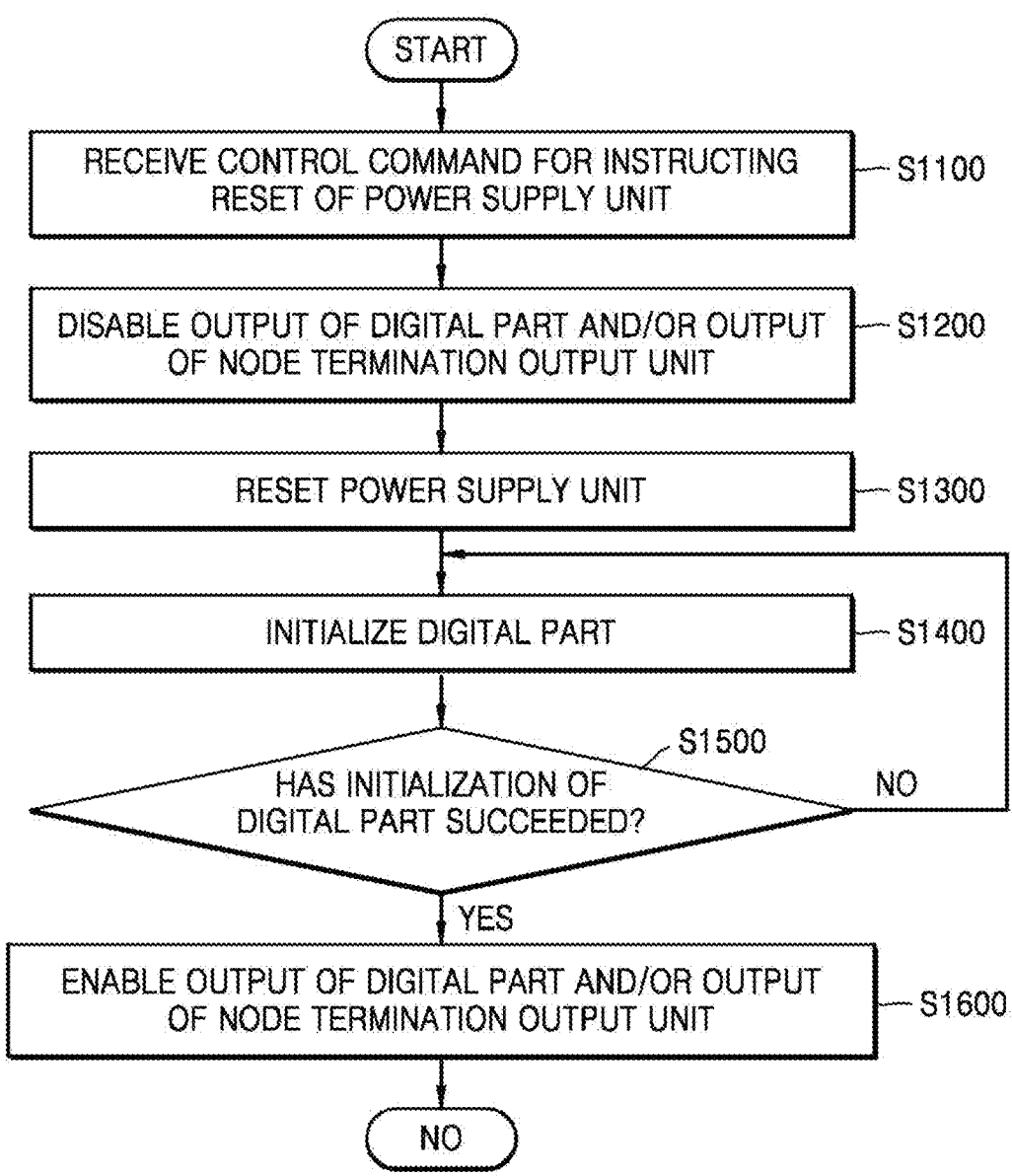
FIG. 10 is a flowchart illustrating a spurious wave interruption method according to another embodiment of the inventive concept.

FIG. 10 is a flowchart illustrating a spurious wave interruption method according to another embodiment of the inventive concept. Steps shown in FIG. 10 are configured as steps processed in time series in the controller 850 of the node unit shown in FIG. 8. Thus, the above-described contents related to the node unit shown in FIG. 8, although some of them are omitted, can be applied to the spurious wave interruption method of FIG. 10. In FIG. 10, descriptions overlapping with those of the spurious wave interruption method of FIG. 9 will be omitted, and differences will be mainly described.

In step S1100, the controller 850 receives a control command for instructing a reset of the power supply unit 840. The controller 850 may remotely receive the control command through the NMS or the local terminal.

In step S1200, the controller 850 disables an output of the digital part DP and/or an output of the node termination output unit 830. In step S1300, the controller 850 resets the power supply unit 840. In step S1400, the controller 850 controls an initialization operation of the components in the digital part DP.

If it is determined in step S1500 that the initialization operation of the digital part PD has succeeded, the controller 850 may enable the output of the disabled components (step S1600). If it is determined in step S1500 that the initialization operation of the digital part PD has not succeeded, the controller 850 may again perform steps S1400 and S1500.

Meanwhile, although processes performed by the controller 850 in response to the control command for instructing the reset of the power supply unit 840 are illustrated in steps S110 to S1600, the inventive concept is not limited thereto. The controller 850 may perform processes substantially similar to steps S1100 to S1600 in response to a control command for instructing a power supply start of the power supply unit 840, or the like.

Although the inventive concept has been described in connection with the exemplary embodiments, the inventive concept is not limited thereto but defined by the appended claims. Accordingly, it will be understood by those skilled in the art that various modifications and changes can be made thereto without departing from the spirit and scope of the inventive concept defined by the appended claims.

What is claimed is:

1. A node unit of a distributed antenna system, comprising:
   a power supply unit configured to supply power for operating the node unit;
   a digital part comprising a plurality of components, and configured to operate by the power supplied from the power supply unit to perform digital processing on relay signals input to the digital part and output the relay signals;
   a power delay unit configured to delay the power supplied to one or more of the plurality of components of the digital part; and
   a controller configured to, in response to receiving a first control command for instructing a reset of the power supply unit or a second control command for instructing a reset of the digital part, disable the plurality of components of the digital part sequentially by controlling the power delay unit such that power supplied to a first component of the digital part is cut off after power supplied to a second component of the digital part is cut off,
   wherein the first component is disposed prior to the second component in a transmission path of the relay signals, and
   wherein at least one of the first control command and the second control command is transmitted from a network management system communicatively connected to the node unit through a network or transmitted from a local terminal.

2. The node unit of claim 1, wherein the plurality of components included in the digital part includes:
   a digital signal processor configured to perform a predetermined digital processing on the relay signals; and
   a digital termination output unit disposed at a termination in the digital part with respect to the transmission path of the relay signals,
   wherein the controller disables at least one of the digital signal processor and the digital termination output unit to disable the digital part.

3. The node unit of claim 1, wherein the controller disables the digital part in response to the first control command and then controls a reset operation of the power supply unit and an initialization operation of the digital part according to the reset operation of the power supply unit, and, if the reset operation of the power supply unit and the initialization operation of the digital part are completed, enables the digital part.

4. The node unit of claim 3, wherein the controller determines whether the initialization operation of the digital part has been completed based on whether a phase lock loop (PLL) lock signal in the node unit is abnormal or whether the relay signals are abnormal.

5. The node unit of claim 1, wherein the controller disables the digital part in response to the second control command and then controls an initialization operation of the digital part, and, if the initialization operation of the digital part is completed, enables the digital part.

6. The node unit of claim 1, wherein the node unit further includes a node termination output unit disposed posterior to the digital part with respect to the transmission path of the relay signals,
   wherein the controller disables the node termination output unit by blocking an output of the node termination output unit in response to the first control command or the second control command.

7. The node unit of claim 6, wherein the controller simultaneously disables the digital part and the node termination output unit or sequentially disables, at a predetermined time interval, the digital part and the node termination output unit, in response to the first control command or the second control command.

8. The node unit of claim 6, wherein the controller disables the digital part and the node termination output unit in response to the first control command and then controls a reset operation of the power supply unit and an initialization operation of the digital part according to the reset operation of the power supply unit, and, if the reset operation of the power supply unit and the initialization operation of the digital part are completed, enables the digital part and the node termination output unit.

9. The node unit of claim 8, wherein the controller simultaneously enables the digital part and the node termination output unit or sequentially enables, at a predetermined time interval, the digital part and the node termination output unit.

10. The node unit of claim 6, wherein the controller disables the digital part and the node termination output unit in response to the second control command and controls an initialization operation of the digital part, and, if the initialization operation of the digital part is completed, enables the digital part and the node termination output unit.

11. The node unit of claim 6, wherein the node termination output unit is a power amplifier that amplifies the relay signals received from the digital part.

12. The node unit of claim 6, wherein the node termination output unit is an optical processing part that performs optical-to-electrical conversion or electrical-to-optical conversion on the relay signals received from the digital part.

13. A node unit of a distributed antenna system, comprising:
   a power supply unit configured to supply power for operating the node unit;
   a digital part operated by the power supplied from the power supply unit, wherein the digital part including:
      a digital signal processor configured to perform a predetermined digital processing on relay signals; and
      a digital termination output unit disposed at a termination in the digital part with respect to a transmission path of the relay signals;
   a power delay unit configured to delay power supplied to the digital signal processor; and
   a controller configured to, in response to receiving a first control command for instructing a reset of the power supply unit or a second control command for instructing a reset of the digital part, disable the digital signal processor and the digital termination output unit sequentially by controlling the power delay unit such that power supplied to the digital termination output unit is cut off before the power supplied to the digital signal processor is cut off,
   wherein the digital signal processor is disposed prior to the digital termination output unit in the transmission path of the relay signals.

* * * * *